United States Patent [19]
Ai et al.

[11] Patent Number: 4,645,823
[45] Date of Patent: Feb. 24, 1987

[54] POLYAMIDE PREPARATION FROM POLYCARBOXYLIC ACID AND POLYAMINE WITH CARBODIIMIDE CONDENSING AGENT

[75] Inventors: Hideo Ai; Akihiko Ikeda; Yoshio Matsuoka, all of Fuji, Japan

[73] Assignee: Asahi Kasei Kogyo Kabushiki Kaisha, Osaka, Japan

[21] Appl. No.: 774,751

[22] Filed: Sep. 10, 1985

[30] Foreign Application Priority Data

Sep. 14, 1984 [JP] Japan ................................. 59-193737

[51] Int. Cl.$^4$ ............................................. C08G 69/28
[52] U.S. Cl. ..................................... 528/336; 528/21; 528/26; 528/182; 528/183; 528/188; 528/224; 528/229; 528/315; 528/337; 528/351; 528/352; 528/353
[58] Field of Search ............... 528/336, 315, 182, 183, 528/188, 351, 352, 353, 224, 225, 21, 26, 337

[56] References Cited

U.S. PATENT DOCUMENTS

| | | | |
|---|---|---|---|
| 2,130,523 | 9/1938 | Carothers | 528/347 |
| 2,878,235 | 3/1959 | Butler et al. | 528/347 |
| 3,015,652 | 1/1962 | Schnell et al. | 528/315 |
| 4,465,821 | 8/1984 | Nielinger et al. | 528/347 |

OTHER PUBLICATIONS

Morgan, Condensation Polymers by Interfacial and Solution Methods, Chapter IV, pp. 115 to 162 (1965).
Ueda et al., Journal of Polymer Science, Polymer Chem. Edition, vol. 23, 1607–1613 (1985).

Primary Examiner—Harold D. Anderson
Attorney, Agent, or Firm—Berman, Aisenberg & Platt

[57] ABSTRACT

A process for preparing polyamides which comprises polycondensing dicarboxylic acids having the following general formula and diamines by using carbodiimides as the condensing agent.

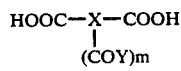

wherein
X is a group having a valence of (m+2), and $C_{6-20}$ carbocyclic group, $C_{3-20}$ heterocyclic group, $C_{2-20}$ alkyl group, or $C_{2-20}$ alkenyl group, the group having at least one carbon-carbon double bond in the position of conjugating to carboxylic acid radical or the group having an $\alpha,\beta$-unsaturated ketone structure;
Y is —OR or —NRR' wherein R and R' each independently is $C_{5-20}$ carbocyclic group, $C_{1-20}$ heterocyclic group, $C_{1-20}$ alkyl group or substituted group thereof having at least one substituent selected from the group consisting of —OW (wherein W is $C_{1-12}$ alkyl group), $C_{2-12}$ saturated acyl group, $C_{2-12}$ saturated acyloxy group, $C_{2-12}$ saturated acylamino group, $C_{2-12}$ dialkylamino group, —SW (wherein W is the same as defined above), $C_{2-12}$ saturated acylthio group and $C_{3-12}$ group having at least one silicon atom;
m is 0, 1 or 2; and
—COY can be attached to any of the positions ortho, peri, $\beta$ and $\gamma$ with respect to the —COOH group.

29 Claims, No Drawings

POLYAMIDE PREPARATION FROM POLYCARBOXYLIC ACID AND POLYAMINE WITH CARBODIIMIDE CONDENSING AGENT

BACKGROUND OF THE INVENTION

1. Field of the Invention

This invention relates to an improved method for preparing a polyamide. More particularly, this invention relates to the method using a specific condensing agent.

2. Description of the Prior Art

As particularly described in "Condensation Polymers by Interfacial and Solution Methods" (Morgan; Interscience, New York, 1965), Morgan and his school of E. I. Du Pont de Nemours & Company (U.S.A.) made a systematic study on interfacial condensation polymerization and low temperature solution polymerization using an acid chloride for preparing polyamides, and established the simple methods for preparing polyamides at room temperature in 1958. The methods have been widely used for preparing polyamides, and industrialized to produce polyamides, such as Nomex ® and Kevlar ®.

Further, various studies for synthesizing polyamides under mild and neutral conditions have been made, and some of the methods, such as a process through an active ester intermediate, have been reported [see, for example, Ueda et al.; Journal of Polymer Science, Polymer Chemistry Edition Vol. 23, 1607–1613 (1985)].

However, Morgan's methods are subject to problems, such as generation of toxic gas and corrosion of apparatus, because Morgan's methods are carried out under strong acidic conditions. Further, disposal of a large amount of produced acidic waste water is also a big problem. Moreover, the products by Morgan's methods are usually contaminated with several hundred ppm of chlorine because of a certain side reaction, and it is difficult to remove the chlorine from the product. Furthermore, polyamides produced by Morgan's methods contain chloride ions as impurities, and it is very difficult to decrease them to several ppm or less by an ordinary process.

Polyamides and polymers produced from the polyamides, such as polyimides and polyamide-imides, have been widely used as materials for electric or electronic articles, such as insulators flexible print circuit boards and molding materials. Further, these polymers are newly used for coating materials for semiconductor interlayer insulation materials for LSI (large scale integrated) circuits and thermal resistant films. In these applications, even a trace amount of chloride ion brings about a serious problem of corrosion or lowering of the capability of the device.

Methods proposed by Ueda et al. also have problems; complicated operations are required to isolate the intermediate. Further, since the intermediate is produced under strongly acidic conditions, the methods have not yet been industrialized.

Accordingly, a new process which can be carried out under mild and neutral conditions and can produce polyamides having no undesirable impurities, such as chloride ions, is desired.

SUMMARY OF THE INVENTION

To overcome the described problems, the inventors of the present invention researched and reached to the idea of using a dehydrating condensing agent which generates neither strong acids nor strong bases in the reaction of preparing polyamides. The inventors continued the research regarding dehydrating condensing agents, and found that carbodiimides are satisfactory.

Carbodiimides are known as dehydrating condensing agents used in forming peptides from amino acids (see, for example, Izumiya et al.; Synthesis peptides, pp144–148, published by Maruzen in 1975). However, the process for forming peptides is completely different from the process for preparing polyamides of the present invention. The peptides are formed by bonding an amino acid or an oligopeptide one by one. On the other hand, polyamides are prepared by polycondensing dicarboxylic acids and diamines according to the present invention.

The process for preparing polyamides disclosed in the present invention comprises polycondensing dicarboxylic acids and diamines by using carbodiimides as the condensing agent.

DETAILED DESCRIPTION OF THE INVENTION

As methods for polycondensing dicarboxylic acids and diamines, melt polycondensation, interfacial polycondensation or solution polycondensation can be employed in this invention. Among them, solution polycondensation is preferred in view of the simplicity of isolating polyamides. In this invention, solution polycondensation is defined as a condensation reaction carried out in solvent which can dissolve both monomers and condensing agents.

Various solvents are employed in solution polycondensation, and aprotic solvents are preferred because the possibility of side reactions is low.

Among the aprotic solvents, the aprotic polar solvents are preferable. Exemplary aprotic polar solvents include dialkylamide compounds, such as N,N-dimethylacetamide and N,N-dimethylformamide; N-alkyllactams, such as N-methylpyrrolidone; hexaalkylphosphorictriamides, such as hexamethylphosphorictriamide; lactones, such as γ-butyrolactone; cyclic ethers, such as tetrahydrofuran and dioxane; and sulfoxides such as dimethyl sulfoxide.

Other aprotic solvents are optionally used, for example, ethers such as diethyl ether; esters, such as ethyl acetate; ketones, such as acetone, methyl ethyl ketone, methyl isobutyl ketone, cyclopentanone and cyclohexanone; nitriles, such as acetonitrile; chlorine-containing hydrocarbons, such as chlorobenzene, chloroform, methylene chloride, 1,2-dichloroethane and 1,1,1-trichloroethane; tetraalkyl ureas; and pyridines.

Various carbodiimides can be employed as the condensing agent for this invention. Carbodiimides are classified by whether the ureas produced from the carbodiimides are soluble in acidic water or not. When the ureas are insoluble in acidic water, the ureas are also insoluble in almost all of the organic solvents. Therefore, the ureas can be easily removed from a polyamide solution by filtering the reaction mixture. Preferable examples of this type of carbodiimides include N,N'-dicyclohexylcarbodiimide, N,N'-diethylcarbodiimide, N,N'-diisopropylcarbodiimide, N-ethyl-N'-cyclohexylcarbodiimide and N,N'-diphenylcarbodiimide.

Further, when the ureas produced from the carbodiimides are soluble in acidic water, the ureas can be easily removed from polyamides by washing the reaction solution with acidic water. Preferable examples of this type of carbodiimides include 1-ethyl-3-(3-dimethylaminopropyl)carbodiimide, 1-cyclohexyl-3-(3-dimethylaminopropyl)carbodiimide and carbodiimide.

Various dicarboxylic acids corresponding to the desired polyamides can be employed in this invention. For example, the dicarboxylic acids having the following general formula (I)

HOOC—X—COOH (I)

wherein
X is a group having a valence of 2, and $C_{6-20}$ carbocyclic group, $C_{3-20}$ heterocyclic group, $C_{2-20}$ alkyl group, $C_{2-20}$ alkenyl group, the group having at least one carbon-carbon double bond in the position of conjugating to carboxylic acid radical or the group having an $\alpha,\beta$-unsaturated ketone structure, can be used.

Preferable examples of the dicarboxylic acids represented by the formula (I) include oxalic acid, malonic acid, succinic acid, glutaric acid, adipic acid, pimelic acid, suberic acid, azelaic acid, sebacic acid, hexahydrophthalic acid, 4-Δ-1,2-cyclohexendicarboxylic acid, dioxane-2,5-dicarboxylic acid and piperazine-1,4-dicarboxylic acid.

When the dicarboxylic acids having the aromatic carbocyclic group in X of formula (I) are used in this invention, polyamides having high thermal resistance can be produced. Preferable examples of the dicarboxylic acids represented by formula (I) when X is aromatic carbocyclic group include isophthalic acid, terephthalic acid, 2,6-naphthalenedicarboxylic acid, 1,4-naphthalenedicarboxylic acid, methylterephthalic acid, biphenyl-2,2'-dicarboxylic acid, diphenylmethane-4,4'-dicarboxylic acid, diphenylether-4,4'-dicarboxylic acid, diphenylsulfone-4,4'-dicarboxylic acid and 1,1,1,3,3,3-hexafluoro-2,2'-bis(4-carboxyphenyl)propane.

When the dicarboxylic acid having at least one carbon-carbon double bond in the position of conjugating to the carboxylic acid radical or having an $\alpha,\beta$-unsaturated ketone structure are used in this invention, the polyamides obtained become sensitive to radiation such as visible light, ultraviolet rays, X-rays and electron beam. Therefore, it is possible to form an image insoluble in a solvent by exposing the polyamides to these radiations. Preferable examples of the dicarboxylic acid having at least one carbon-carbon double bond in the position of conjugating to the carboxylic acid radical or having an $\alpha,\beta$-unsaturated ketone structure include 4-carboxycinnamic acid, p-phenylenediacrylic acid, maleic acid, fumaric acid, 4,4'-dicarboxychalcone and di(4-carboxybenzylidene)acetone.

Further, when the dicarboxylic acids of formula (II).

wherein
X is a group having a valence of (m+2), and $C_{6-20}$ carbocyclic group, $C_{3-20}$ heterocyclic group, $C_{2-20}$ alkyl group or $C_{2-20}$ alkenyl group;
Y is —OR or —NRR' wherein each of R and R', independently, is $C_{5-20}$ carbocyclic group, $C_{1-20}$ heterocyclic group, $C_{1-20}$ alkyl group or substituted groups thereof having at least one substituent selected from the group consisting of —OW (wherein W is $C_{1-12}$ alkyl group), $C_{2-12}$ saturated acyl group, $C_{2-12}$ saturated acyloxy group, $C_{2-12}$ saturated acylamino group, $C_{2-12}$ dialkylamino group, —SW (wherein W is the same as defined above), $C_{2-12}$ saturated acylthio group and $C_{3-12}$ group having at least one silicon atom;
m is 1 or 2; and
—COY can be attached to any of the positions ortho, peri, $\beta$ and $\gamma$ with respect to the —COOH group, are used produced polyamides can change to polyamide-imides or polyimides having high thermal resistance after heat treatment.

Preferable examples of trivalent $C_{6-20}$ carbocyclic groups as X include groups, such as

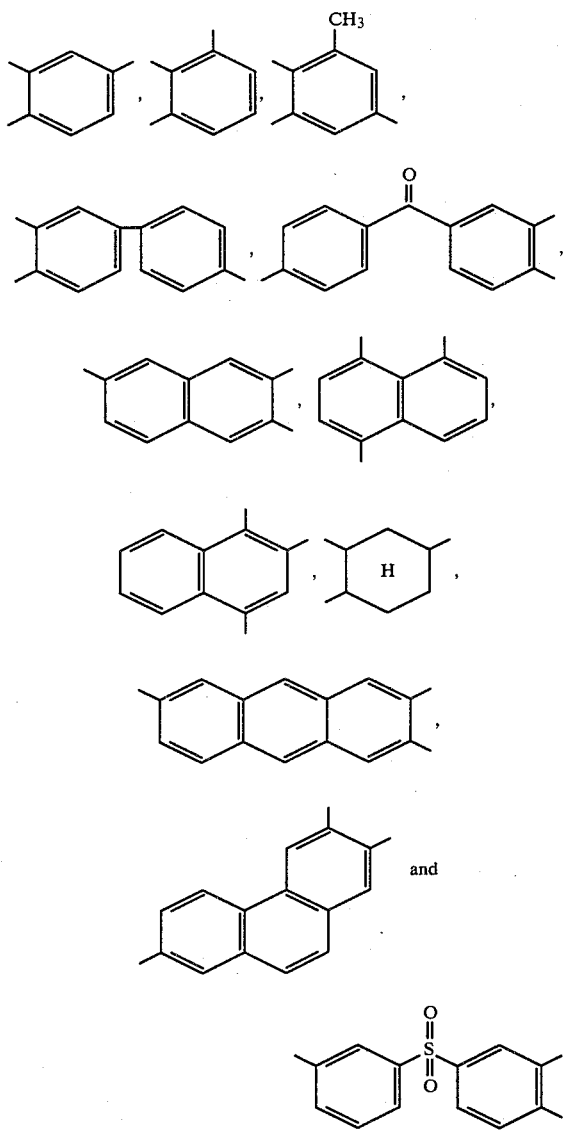

Preferable examples of tetravalent $C_{6-20}$ carbocyclic groups as X include groups, such as

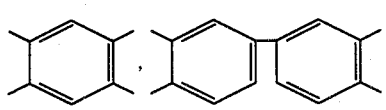

-continued

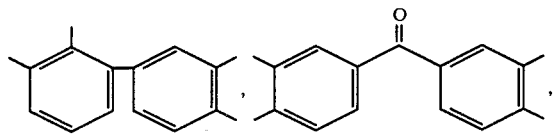

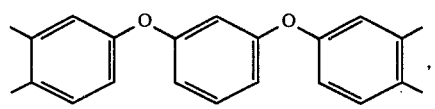

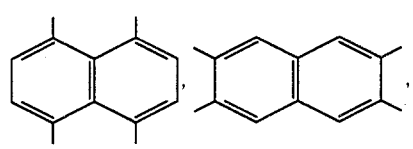

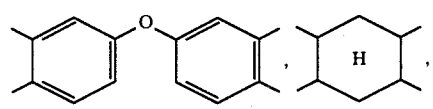

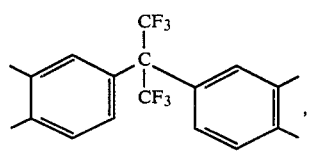

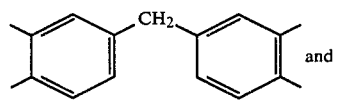

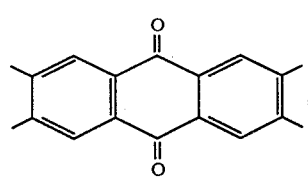

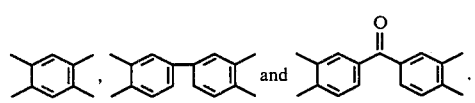

and the following groups are more preferred in view of the use for polyimide precursor:

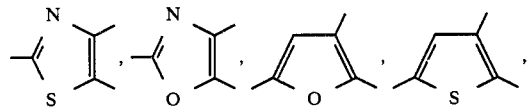

Preferable examples of trivalent $C_{3-20}$ heterocyclic groups as X include groups, such as

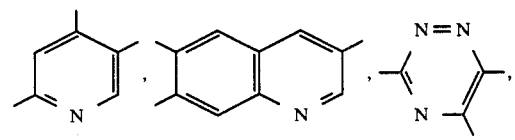

-continued

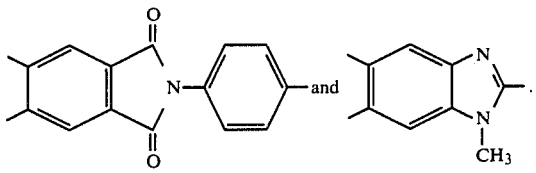

Preferable examples of tetravalent $C_{3-20}$ heterocyclic groups as X include groups, such as

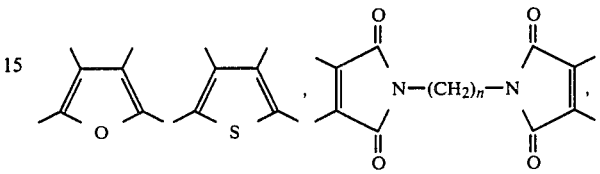

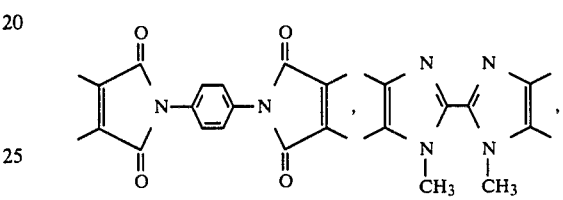

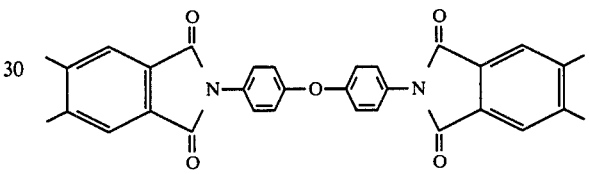

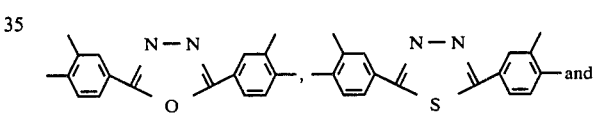

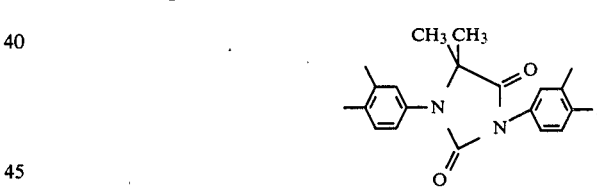

(wherein n is an integer from 2 to 6.)

Preferable examples of $C_{2-20}$ alkyl groups and, $C_{2-20}$ alkenyl groups as X include groups, such as

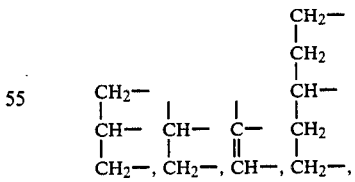

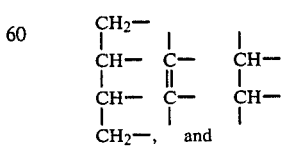

Preferable examples of $C_{5-20}$ carbocyclic groups as R and R' include the phenyl group, tolyl group, naphthyl group, cyclohexyl group and cyclopentenyl group.

Preferable examples of $C_{1-20}$ heterocyclic groups as R and R' include the 1-methyl-5-tetrazolyl group, 1-methyl-3-(1,2,4-triazolyl) group, pyridyl group, quinolyl group, 2-thiophenyl group and 2-furanyl group.

Preferable examples of $C_{1-20}$ alkyl groups as R and R' include the methyl group, ethyl group, isopropyl group, n-butyl group, hexyl group, lauryl group and stearyl group.

As R and R', $C_{5-20}$ carbocyclic groups, $C_{1-20}$ heterocyclic groups or $C_{1-20}$ alkyl groups, each having at least one substituent selected from the group consisting of —OW, a $C_{2-12}$ saturated acyl group, a $C_{2-12}$ saturated acyloxy group, a $C_{2-12}$ saturated acylamino group, a $C_{2-12}$ dialkylamino group, —SW, a $C_{2-12}$ saturated acylthio group and a $C_{3-12}$ group having at least one silicon atom, can be used.

Exemplary substituted $C_{5-20}$ carbocyclic groups include groups represented by the formulae $P^1$, each having at least one substituent selected from the group represented by the formulae $Q^1$:

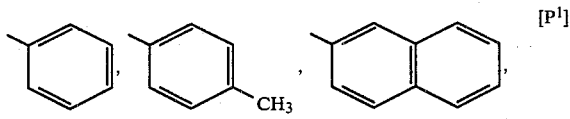

[P¹]

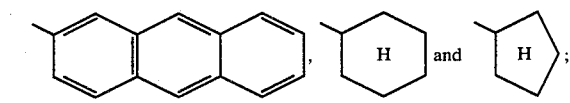

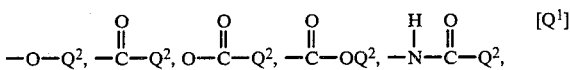

[Q¹]

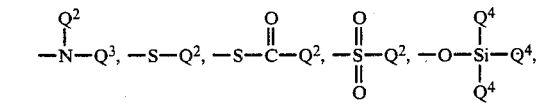

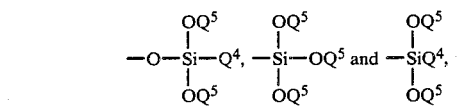

wherein each of $Q^2$ and $Q^3$ is —CH₃, —C₂H₅, —C₃H₇,

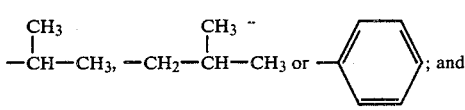

each of $Q^4$ and $Q^5$ is —CH₃, —C₂H₅ or .

Exemplary substituted $C_{1-20}$ heterocyclic groups include the groups represented by the formulae $P^2$, each having at least one substituent selected from the group represented by the formula $Q^1$ as described above:

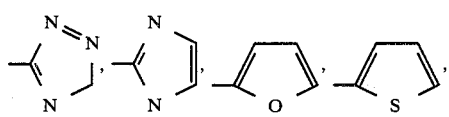

[P²]

-continued

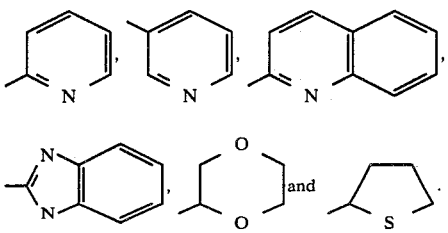

Exemplary substituted $C_{1-20}$ alkyl groups include the groups represented by formulae $P^3$, each having at least one substituent selected from the group represented by formula $Q^1$, as described above:

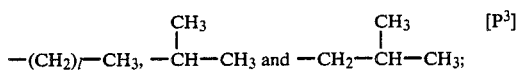

[P³]

wherein l is an integer from 0 to 6.

Preferable examples of Y include the methoxy group, ethoxy group, isopropoxy group, phenoxy group, allyloxy group, 2-pyridyloxy group, 4-pyridyloxy group, furfuryloxy group, 2-acetyloxyethyloxy group, 2,3-dimethoxypropyloxy group, acetylaminomethyloxy group, 2-acrylthioethyloxy group, N-phenyl-N-(3-trimethylsilyl)propylamino group and N-methyl-N-(4-dimethylamino)phenylamino group.

Preferable examples of dicarboxylic acids represented by formula (II) include trimellitic acid 2-ethyl ester, trimellitic acid 1-diethylamide, pyromellitic acid 2,5-dimethyl ester, mixture of pyromellitic acid 2,4-diethyl ester and pyromellitic acid 2,5-diethyl ester, naphthalene-1,4,5,8-tetracarboxylic acid 1,5-diethyl ester, naphthalene-2,3,6,7-tetracarboxylic acid 2,6-bis-dimethylamide, 3,3',4,4'-diphenyltetracarboxylic acid 3,4'-diisopropyl ester, 1,1,1,3,3,3-hexafluoro-2,2-bis(3,4-dicarboxyphenyl)propanediethyl ester, benzophenone-3,3',4,4'-tetracarboxylic acid diethyl ester, bis(3,4-dicarboxyphenyl)ether dimethyl ester, bis(3,4-dicarboxyphenyl)sulfone diphenyl ester, ethylenetetracarboxylic acid diethyl ester, 2,3-dicarboethoxy-1,4-butanedicarboxylic acid, 3,4-dicarbomethoxyadipic acid, 3-carboxyglutaric acid 1-ethyl ester,

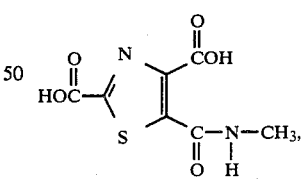

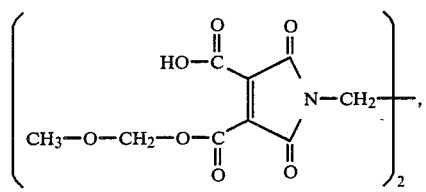

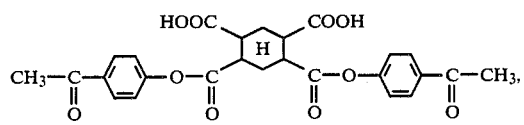

-continued

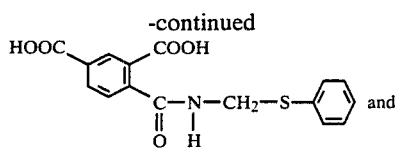
and

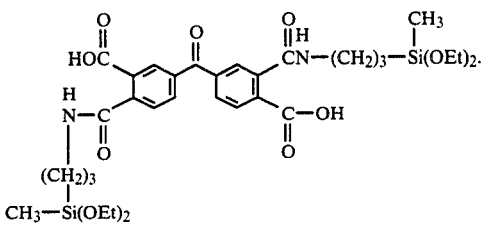

Polyimides and polyamide-imides which are prepared from polyamides produced by using the described specific dicarboxylic acids show higher thermal resistance and stronger mechanical properties than those prepared with conventional polyimides and polyamideimides by ordinary methods using acid chlorides.

As the dicarboxylic acid component, one or more dicarboxylic acids can be used in this invention.

Various diamines, corresponding to the desired polyamides can be employed in this invention. For example, aliphatic and alicyclic diamines, can be used, and preferable examples of these diamines include ethylenediamine, 1,3-propylenediamine, 1,2-propylenediamine, 1,4-butanediamine, 2,2-dimethyl-1,3-propylenediamine, hexamethylenediamine, 1,4-cyclohexanediamine, 3-methoxyhexamethylenediamine, decamethylenediamine, bis(3-aminopropyl)sulfide, bis(4-aminocyclohexyl)methane and piperazine.

When aromatic diamines are used, polyamides having high thermal resistance can be produced. Preferable examples of the aromatic diamines include meta-phenylenediamine, para-phenylenediamine, 4,4'-diaminodiphenylpropane, 4,4'-diaminodiphenylmethane, 3,3'-diaminodiphenyl sulfone, 3,4'-diaminodiphenyl sulfone, 4,4'-diaminodiphenyl sulfide, benzidine, 4,4'-diaminodiphenyl ester, 1,5-diaminonaphthalene, meta-toluidine, 3,3'-dimethylbenzidine, 3,3'-dimethoxybenzidine, 3,4'-diaminodiphenyl ether, ortho-toluidine sulfone, phenylindanediamine, 1,1,1,3,3,3-hexafluoro-2,2-bis(4-aminophenyl)propane, 1,1,1,3,3,3-hexafluoro-2,2-bis(4-aminophenoxyphenyl)propane, bis(4-aminophenoxyphenyl)sulfone, 1,4-bis(4-aminophenoxy)benzene, 1,3-bis(4-aminophenoxy)benzene, 9,9-bis(4-aminophenyl)fluorene, 4,4'-diaminobenzanilide, bis(4-β-amino-t-butylphenyl)ether, and meta-xylylenediamine.

To improve the adhesive property of the polyamides, diamines having at least one silicon atom can be employed. Preferable examples of the diamines include compounds having the following formulae:

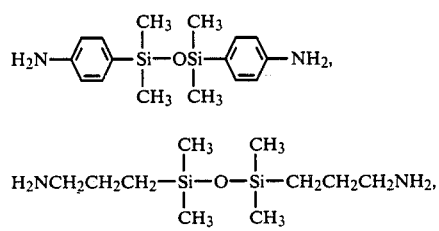

-continued

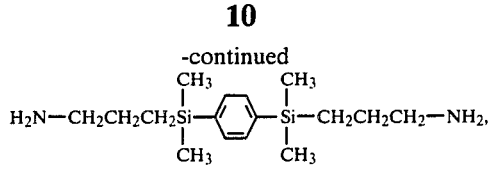

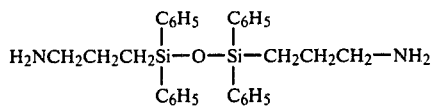

and mixtures thereof. The compounds having the following formulae are also preferable.

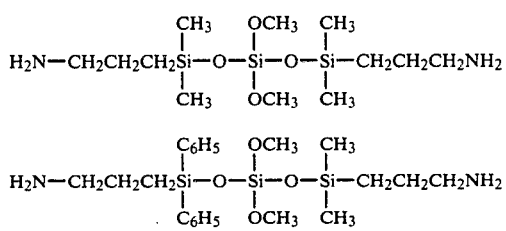

As the diamine component, one or more diamines can be used in this invention.

Conventional reaction conditions for polycondensing dicarboxylic acids and diamines can be employed in this invention. Though the reaction temperature is not limited so far as the reaction occurs, it is preferably from $-20°$ C. to $80°$ C. in view of the reaction rate and by-products, and more preferably from $-10°$ C. to $30°$ C. The amount of condensing agent as is follows. When the dicarboxylic acids are in excess with respect to the diamines, the molar ratio of condensing agent to diamine is 2 or more, and preferably from 2 to 3. When the diamines are in excess with respect to the dicabolxylic acids, the molar ratio of condensing agent to dicarboxylic acid is 2 or more, and preferably from 2 to 3. However, there is no problem when an excess amount of condensing agent is used. The amount of solvent preferably ranges from 500 ml to 10 l per mole of condensing agent. The reaction time is preferably from 10 minutes to 100 hours, and more preferable from one hour to 24 hours. It is preferable to use additives, such as 1-hydroxybenzotriazole, N-hydroxysuccinimide and pyridine, to enhance the reaction rate. Though not limited, it is preferable to add the carbodiimides to the mixture of the solvents and the dicarboxylic acids at first to react in part, and then add the diamines to the reaction mixture to obtain the polyamides having high molecular weight and high stability. The mole ratio of dicarboxylic acids to diamines is preferably around 1.0, but can be from 0.7 to 1.3 depending on the molecular weight of the desired polyamides. To control the molecular weight of the polyamides, monofunctional alcohols or amines may be added to the reaction mixture. To stop the reaction, conventional methods, such as dilution of the reaction mixture, isolation of the polyamides produced, and inactivation of the active terminal groups with alcohols, can be employed in this invention.

The polyamides produced in the methods of the present invention can be isolated from the solvents, remaining condensing agents and ureas produced from the condensing agents by using conventional methods, such as filtration, washing, reprecipitation with water or organic solvents and distillation, depending on the properties of the polyamides and the kind of the condensing agents used.

In the present invention, carbodiimides work as a dehydrating condensing agent. After the reaction, ureas are produced together with polyamides according to the following reaction equation:

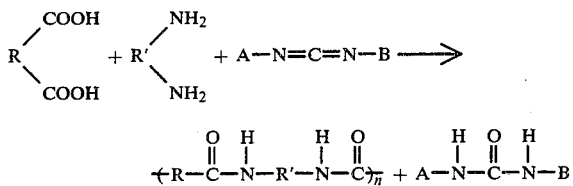

wherein R and R' are divalent organic groups, and A and B are monovalent organic groups.

The carboxylic acid terminal groups of the polyamides can generally be converted to esters by adding alcohols to the reaction products after the reaction is completed. However, a part of terminal groups can be acylureas as follows, due to a side-reaction of the carbodiimides.

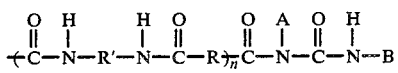

wherein R, R', A and B are the same as previously defined.

The terminal groups having acylurea structure can be confirmed by NMR spectrum or thermal decomposition gas chromatography. For example, when dicyclohexylcarbodiimide is used as the condensing agent, a broad absorption of the cyclohexyl group is observed at δ 0.9–1.8 by NMR spectrum, and cyclohexyl isocyanate is confirmed by thermal decomposition gas chromatography. Depending on the reaction conditions, the amount of terminal groups having acylurea structure is generally from 10–80% based on the total amount of polymer terminals according to the analysis.

The polyamides having acylurea terminals can provide polyimides or polyamide-imides having superior thermal resistance and mechanical properties, as compared with conventionally obtained counterparts. The acylurea terminals can be converted to imide structure at the cyclization of the polyamides.

According to the present invention, polyamides can be prepared under mild and neutral conditions. Further, problems, such as corrosion of apparatus, difficulty of recovering solvents and disposal of an enormous volume of acidic waste water generated can be overcome. Moreover, polyamides (containing very few chlorine ions) suitable for use of electronic articles can be easily obtained by this invention. Polyamides produced by the present invention are useful as a photoresist component.

The following Examples are given to illustrate the present invention more specifically. However, it should be understood that the invention is in no way limited by these Examples.

EXAMPLE 1

Into a 300-ml separation flask, 16.6 g of isophthalic acid, 100 ml of N-methylpyrrolidone, 20.0 g of 4,4'-diaminodiphenyl ether and 0.5 g of pyridine were placed, and the solution containing 41.2 g of N,N'-dicyclohexylcarbodiimide and 40 ml of N-methylpyrrolidone was added dropwise to the mixture over 30 minutes with stirring under cooling in an ice bath. After further stirring for 24 hours at 23° C., 5 ml of ethanol were added to the mixture and stirring was continued for 4 hours. The reaction mixture was filtered and the filtrate was added dropwise to 10 l of ethanol under stirring to give precipitate. The precipitate was separated by filtration, washed with ethanol and dried under vacuum to give 27.0 g of a white powder. The inherent viscosity [η] of the product measured in conc. sulfuric acid at the concentration of 0.5 g/dl at 30° C. was 0.50 dl/g. The weight-average molecular weight was measured to be 50,000 by means of gel permeation chromatography (GPC). This molecular weight is called as "MW(GPC)" hereinafter. This product is called PA-1, and the above-described synthesis method is called Method A.

EXAMPLES 2–5

The same procedures as described in Example 1 were carried out except that carbodiimides shown in Table 1 were employed instead of 41.2 g of N,N'-dicyclohexylcarbodiimide. The results are shown in Table 1.

TABLE 1

| Example No. | Carbodiimide (g) | Yield (g) | [η] (g/dl) | MW (GPC) |
|---|---|---|---|---|
| 2 | N,N'—diethylcarbodiimide (19.6) | 25.0 | 0.55 | 52,000 |
| 3 | N,N'—diisopropylcarbodiimide (25.6) | 28.0 | 0.52 | 50,000 |
| 4 | Ethylcyclohexylcarbodiimide (30.4) | 28.0 | 0.52 | 50,000 |
| 5 | Diphenylcarbodiimide (38.8) | 22.0 | 0.45 | 43,000 |

COMPARATIVE EXAMPLE 1

Into a 300-ml separation flask, 19.8 g of 4,4'-diaminodiphenyl ether, 100 ml of N-methylpyrrolidone and 170 g of pyridine were placed, and 20.3 g of isophthalic acid dichloride were added dropwise to the mixture over 15 minutes with stirring under cooling in an ice bath. After further stirring the mixture for 24 hours at 23° C., 5 ml of ethanol were added to the mixture, and stirring was continued for 4 hours. The reaction mixture was added dropwise to 10 l of water under stirring to give precipitate. The precipitate was separated by filtration, washed with water and ethanol, and dried under vacuum to give 26.0 g of a white powder. The inherent viscosity [η] of the product measured in the same manner as in Example 1 was 0.48 dl/g. MW(GPC) was 47,000. This product is called PA-2.

REFERENCE EXAMPLE 1

100 g of pyromellitic dianhydride and 200 ml of ethanol were placed in a 300-ml flask, and the mixture was heated at 70° C. for one hour. Then mixture was cooled to give crystals. The crystals were obtained by filtration and were recrystallized in ethanol to give 44.0 g of pyromellitic acid-1,4-diethyl ester. The proton nuclear magnetic resonance spectrum (NMR spectrum) of the compound showed an absorption at δ-values 1.40 (triplet, 6H), 4.40 (quadruplet, 4H), 8.03 (singlet, 2H) and 11.50 (broad, 2H).

EXAMPLE 6

31.0 g of pyromellitic acid-1,4-diethyl ester, 100 ml of γ-butyrolactone and 17.0 g of pyridine were placed in a 500-ml separation flask, and a solution containing 41.2 g of N,N'-dicyclohexylcarbodiimide and 40 ml of γ-butyrolactone were added dropwise to the mixture over 10 minutes with stirring under cooling in an ice bath. Following that, the solution containing 20.0 g of 4,4'-diaminodiphenylmethane and 100 ml of γ-butyrolactone were added dropwise over 15 minutes. After further stirring the mixture for 8 hours at 10° C., 5 ml of ethanol were added to the mixture and stirring was continued for 4 hours at 23° C. The reaction mixture was filtered and the filtrate was added dropwise to 10 l of isopropanol under stirring to give precipitate. The precipitate was isolated by filtration, washed with isopropanol and dried under vacuum to give 42.0 g of a light red powder. The inherent viscosity [η] of the product measured in N-methylpyrrolidone at a concentration of 1 g/dl at 30° C. was 0.30 dl/g. MW(GPC) was 27,000. This product is called PI-1, and the abovedescribed synthesis method is called Method B.

EXAMPLE 7

32.2 g of 3,3',4,4'-benzophenonetetracarboxylic dianhydride and 100 ml of tetrahydrofuran were placed in a 500-ml separation flask, and to the obtained mixture 5.1 g of 3-phenylaminopropyltrimethoxy silane were added dropwise with stirring under cooling in an ice bath. 13.9 g of isobutyl alcohol were added to the resulting mixture. Following that 17.0 g of pyridine were added dropwise with stirring under cooling in an ice bath. After stirring for 16 hours at 23° C., a solution containing 41.2 g of N,N'-dicyclohexylcarbodiimide and 20 ml of tetrahydrofuran was added to the mixture under cooling in an ice bath for 30 minutes, and a solution containing 18.0 g of 4,4'-diaminodiphenyl methane and 60 ml of N,N-dimethylacetamide was subsequently added thereto over 45 minutes under cooling in an ice bath.

After stirring for 3 hours, 10 ml of ethanol were added to the mixture, and stirring was continued for one hour. The reaction mixture was filtered and the filtrate was added dropwise to 5 l of methanol with stirring to give precipitate. The precipitate was separated by decantation. The precipitate was dissolved in 300 ml of tetrahydrofuran, and the solution was added dropwise to 3.0 l of deionized water with stirring to give precipitate. The precipitate was obtained by filtration, left standing for drying and dried under vacuum to give 45.0 g of a light yellow powder. The inherent viscosity [η] of the product measured in N-methylpyrrolidone at a concentration of 1 g/dl at 30° C. was 0.15 dl/g. MW(GPC) was 18,000. This product is called PI-2, and the above-described synthesis method is called method C.

EXAMPLE 8

14.6 g of adipic acid, 13.6 g of m-xylylenediamine and 100 ml of hexamethylphosphorictriamide were placed in a 200-ml separation flask, and 31.0 g of 1-ethyl-3-(3-dimethylaminopropyl)carbodiimide were added to the mixture with stirring at 23° C. After further stirring the mixture for 24 hours at 23° C., the reaction mixture was added dropwise to 0.01N hydrochloric acid under stirring. The product was filtered, washed with water and dried to give 23.0 g of a white powder. The inherent viscosity [η] of the powder measured in conc. sulfuric acid at the concentration of 0.5 g/dl at 30° C. was 0.20 dl/g. MW(GPC) was 23,000. This powdery product is called PA-3, and the above-described synthesis method is called Method D.

EXAMPLE 9

The same procedures as described in Example 8 were carried out except that 41.8 g of 1-cyclohexyl-3-(3-dimethylaminopropyl)carbodiimide were employed instead of 31.0 g of 1-ethyl-3-(3-dimethylaminopropyl)-carbodiimide. As a result, 24.0 g of a white powder was obtained. The inherent viscosity [η] of the powdery product measured in the same manner as in Example 8 was 0.21 dl/g. MW(GPC) was 24,000.

EXAMPLE 10

16.6 g of terephthalic acid, 100 ml of N,N'-dimethylacetamide and 1.6 g of hexamethylenediamine were placed in a 200-ml separation flask, and to the obtained mixture 8.4 g of carbodiimide were added dropwise with stirring under cooling in an ice bath. The reaction mixture was added dropwise to 1 l of 0.1N hydrochloric acid to give a white powder. The powdery product was filtered, washed with water and dried. The yield was 15.0 g. The inherent viscosity [η] of the product measured in the same manner as in Example 8 was 0.10 dl/g. MW(GPC) was 2,000.

EXAMPLE 11

21.8 g of pyromellitic dianhydride, 22.4 g of 2-hydroxyethyl acetate and 100 ml of γ-butyrolactone were placed in a 500-ml separation flask, and to the mixture 17.0 g of pyridine were added with stirring under cooling in an ice bath. After stirring for 16 hours at 23° C., a solution containing 41.2 g of N,N'-dicyclohexylcarbodiimide and 40 ml of γ-butyrolactone was added to the mixture under cooling in an ice bath over 10 minutes. Thereafter 16.0 g of 4,4'-diaminodiphenyl ether were added over 15 minutes. After stirring for 3 hours under cooling in an ice bath, 5 ml of ethanol were added to the reaction mixture and stirring was continued for one hour. The reaction mixture was filtered to remove precipitate and the filtrate was added to 10 l of ethanol to give precipitate. The precipitates were washed with ethanol and dried under vacuum to give 48.0 g of a light yellow powder. The inherent viscosity [η] of the powdery product (measured in N-methylpyrrolidone at a concentration of 1 g/dl at 30° C.) was 0.25 dl/g. MW(GPC) was 19,000. The NMR spectrum of the product showed an absorption at δ-value 0.9–1.8 (broad), 2.3 (singlet, 6H), 4.5 (broad, doublet, 8H), 7.0 (doublet, 4H), 7.7 (doublet, 4H) and 7.7–8.4 (multiplet, 2H). It was supposed that 50% of polymer terminations had an acylurea structure from the integral value of the absorption at 0.9–1.8. The infrared absorption spectrum of the product showed an absorption (cm$^{-1}$) at 1740, 1660, 1610, 1540, 1500, 1450, 1410, 1300, 1240, 1165 and 1100. This product is called PI-3 and the above-described synthesis method is called Method E.

COMPARATIVE EXAMPLE 2

21.8 g of pyromellitic dianhydride, 22.4 g of 2-hydroxyethyl acetate and 100 ml of γ-butyrolactone were placed in a 500-ml separation flask, and to the mixture 33.0 g of pyridine were added with stirring under cooling in an ice bath. After stirring for 16 hours at 23° C., 23.8 g of thionyl chloride were added to the mixture at 10°–15° C. over 30 minutes. After the mixture was left standing at 15° C. for one hour, a slurry consisting of 16.0 g of 4,4'-diaminoldiphenyl ether and 50 ml of γ-butyrolactone was added dropwise to the mixture over 30 minutes under cooling in an ice bath. After leaving for 2 hours at 15° C., 10 ml of ethanol were added to the mixture, and further left standing for 16 hours at 23° C. to give a solution. The solution was diluted with γ-butyrolactone in the same amount as the solution and the diluted solution was added dropwise to 10 l of deionized water with stirring to give precipitate. The precipitate was filtered, washed and dissolved in N,N-dimethylformamide and filtered. The inherent viscosity [η] of the resin measured at the concentration of 0.5 g/dl at 30° C. was 0.32 dl/g. MW(GPC) was 28,000.

EXAMPLE 13–29

Various polyamides were prepared. Starting materials, synthesis methods and the results are shown in Table 2.

TABLE 2

| Example No. | Dicarboxylic Acid Component | Diamine Component | Synthesis Method | [η] (dl/g) | MW (GPC) | Product |
|---|---|---|---|---|---|---|
| 13 | additive of BTDA*1 and 2-HEA*2 | DADPE*3 | E | 0.21 | 17,000 | PI-5 |
| 14 | terephthalic acid | m-phenylenediamine | A | 0.65 | 60,000 | PA-4 |
| 15 | TMME*4 | hexamethylenediamine | A | 0.40 | 35,000 | PAI-1 |
| 16 | BTDE*5 | 1,5-diaminonaphthalene | B | 0.30 | 20,000 | PI-6 |
| 17 | 4-carboxy cinnamic acid | ethylenediamine | A | 0.42 | 42,000 | PA-5 |
| 18 | TMME | 4,4'-diaminodiphenyl sulfone | B | 0.25 | 22,000 | PAI-2 |
| 19 | biphenyl-4,4'-dicarboxylic acid | 4,4'-diaminodiphenyl methane | A | 0.30 | 22,000 | PA-6 |
| 20 | hexahydrophthalic acid | piperazine | D | 0.19 | 26,000 | PA-7 |
| 21 | 2,6-pyridine-dicarboxylic acid | hexamethylenediamine | A | 0.40 | 35,000 | PA-8 |
| 22 | DCMA*6 | 4,4'-diaminodiphenyl sulfone | B | 0.25 | 22,000 | PI-7 |
| 23 | additive of pyromellitic dianhydride and N—methylolacetamide | BAPDS*7 | E | 0.20 | 14,000 | PI-8 |
| 24 | additive of BTDA and PATS*8 | DADPE | E | 0.19 | 19,000 | PI-9 |
| 25 | additive of trimellitic anhydride and 2,3-dimethoxypropanol | m-phenylenediamine | E | 0.35 | 32,000 | PAI-3 |
| 26 | additive of pyromellitic dianhydride and MDAA*9 | DADPE | E | 0.55 | 48,000 | PI-10 |
| 27 | additive of pyromellitic dianhydride and ATE*10 | DADPE | E | 0.20 | 17,000 | PI-11 |
| 28 | P—phenylenediacrylic acid | BPMS*11 | A | 0.20 | 28,000 | PA-9 |
| 29 | FTP*12 | 2,5-diaminopyridine | A | 0.25 | 28,000 | PAI-4 |

Notes for Table 2
*1 3,3',4,4'-benzophenonetetracarboxylic dianhydride
*2 2-hydroxyethyl acetate
*3 4,4'-diaminodiphenyl ether
*4 trimellitic acid monoethyl ester (mixture of 1-ethyl ester and 2-ethyl ester)
*5 3,3',4,4'-benzophenonetetracarboxylic acid diethyl ester
*6 3,4-dicarbomethoxy adipic acid
*7 1,3-bis(3-aminopropyl)tetramethyl disiloxane
*8 3-phenylaminopropyl trimethoxy silane
*9 4-(diethylamino)-N—methylaniline
*10 acetylthio ethanol
*11 p-bis(3-aminopropyldimethylsilyl)benzene
*12 2,3,5-furantricarboxylic acid-2-(2-pyridyl) ester 100 ml of tetrahydrofuran. The solution was added dropwise to 10 l of deionized water to give precipitate. The precipitate were filtered, washed and dried to give 49.0 g of a light yellow powder. The inherent viscosity [η] of the powdery product measured in N-methylpyrrolidone at a concentration of 1 g/dl at 30° C. was 0.20 dl/g. MW(GPC) was 16,000. This product is called PI-4.

EXAMPLE 12

58 g of hexamethylenediamine and 83 g of isophthalic acid were placed in a 500-ml separation flask which was cooled in an ice bath, and to the mixture 126 g of N,N'-diisopropylcarbodiimide were added dropwise stirring to give a highly viscous liquid containing white particles with vigorous generation of heat. The liquid was quickly spread on a stainless steel container in a thickness of about 1 cm, heated for 3 hours in an oven at 200° C. and left standing for cooling to give a rigid, turbid white resin in a form of a board. The resin was crushed, dissolved in N,N-dimethylformamide and filtered. The inherent viscosity [η] of the resin measured at the concentration of 0.5 g/dl at 30° C. was 0.32 dl/g. MW(GPC) was 28,000.

REFERENCE EXAMPLE 2

Measurement of the concentration of chloride ion

Polymers obtained in above-described Examples were dissolved in an organic solvent containing a small amount of sulfuric acid. The concentration of the chloride ion was measured by titrating with aqueous silver nitrate solution while the electric conductivity was measured. The measurement limiting value of this method was about 1 ppm.

PA-2 and PI-4 contained 60 ppm and 80 ppm of chloride ion, respectively. Other polymers except PA-2 and PI-4 contained no chloride ion more than measurement limiting value.

REFERENCE EXAMPLE 3

Using PI-1 to PI-4, 33% of N-methylpyrrolidone solutions were prepared. Each solution was applied on an aluminum mirror plane freshly prepared by vacuum deposition onto silicon wafer with a thickness of about 4μ by using a spin-coating method, dried at 70° C. and further heated at 400° C. for 30 minutes under a N₂ gas atmosphere to form a polyimide film. The films were left standing under a humidity of 90% at 80° C. for 1000 hours. As a result, no abnormality was observed in PI-1, PI-2 and PI-3. As for PI-4, the aluminum mirror plane was clouded.

A silicon oxide layer was produced on a silicon wafer and 300 aluminum lines, each having 3μ in width and 1μ in thickness, were formed on the surface. On the lines on surface, the polyimide films were formed by using PI-1, PI-2, PI-3 and PI-4, respectively, in the same manner as described above. The products thus obtained were left standing for 2000 hours at 90% humidity at 80° C. as an electric current of 20 V was applied to the aluminum lines. No abnormality was observed in the products with polyimide films formed by PI-1, PI-2 and PI-3. On the other hand, opening of the line was observed in 14 lines of the product with polyimide film of PI-4.

REFERENCE EXAMPLE 4

In 50 g of N-methylpyrrolidone were dissolved 25 g of PA-1, 10 g of ethylene glycol diacrylate, 0.1 g of Michler's ketone, 0.5 g of benzophenone and 1.0 g of benzyldimethylketal to give a homogeneous solution. The solution was coated on a surface of copper-clad laminate plate (glass epoxy substrate) after polishing up the surface with buff, and dried at 70° C. for 2 hours to form a uniform 40 μm thick film. The film was subjected to exposure through a patterned mask by using an ultrahigh pressure mercury lamp (8 mW/cm²) for 5 minutes under N₂ gas atmosphere. Subsequently, development was carried out by spraying a mixture (consisting of the same amounts of N,N-dimethylacetamide and ethanol) to the film for 30 seconds to obtain polyamide patterns. The patterns, which were dried under N₂ gas atmosphere at 280° C. for 2 hours, had sufficient surface hardness. No abnormality was observed in the patterns even if the patterns were dipped into a solder bath at 260° C. for 10 seconds. This test is called a solder heat-resistance test hereinafter. No abnormality was also observed in the copper surface under the film when the patterns were left standing at 85% humidity at 80° C. for 200 hours. This test is called a corrosion test hereinafter.

REFERENCE EXAMPLE 5

The same procedures as described in Reference Example 4 were carried out except that PA-2 was used instead of PA-1 to form polyamide patterns. When the patterns were left standing at 85% humidity at 80° C. for 200 hours, the copper surface under the film was observed to be cloudy.

REFERENCE EXAMPLE 6-11

Various polyamide patterns were formed by repeating the same procedures as described in Reference Example 4 except PA-4, PA-5, PA-6, PAI-1, PAI-2 and PI-1 were used respectively instead of PA-1. After each pattern was subjected to heat treatment, the patterns were tested in the same manner as in Reference Example 4. The conditions of heat treatment and the results of the tests are shown in Table 3.

TABLE 3

| Reference Ex No. | Polymer | Film Thickness (μ) | Heat Treatment Temperature (°C.) | Time (hr.) | Solder Heat-Resistance Test (Temperature (°C.)) | Corrosion Test |
|---|---|---|---|---|---|---|
| 6 | PA-4 | 35 | 280 | 2 | No abnormality (260° C.) | No abnormality |
| 7 | PA-5 | 30 | 200 | 2 | No abnormality (230° C.) | No abnormality |
| 8 | PA-6 | 40 | 280 | 2 | No abnormality (280° C.) | No abnormality |
| 9 | PAI-1 | 25 | 300 | 2 | No abnormality (320° C.) | No abnormality |
| 10 | PAI-2 | 25 | 350 | 2 | No abnormality (350° C.) | No abnormality |
| 11 | PI-1 | 20 | 140 / 400 | 2 / 2 | No abnormality (400° C.) | No abnormality |

REFERENCE EXAMPLE 12

Each solution prepared in Reference Examples 4, 5, 6 and 8 was left standing at 23° C. to observe the change of the viscosities of the solutions. After 3 days, decrease of the viscosity was observed in the solution prepared in Reference Example 5. No abnormality was observed in other solutions after 7 days passed.

REFERENCE EXAMPLE 13

20 g of PA-5 and 0.8 g of 2.6-bis(4-azidobenzal)cyclohexane were dissolved in 20 g of cyclohexanone to give a homogeneous solution. The solution was applied on a silicon wafer by using a spin coater and dried at 60° C. for one hour to form a 10 μm thick film. The film was subjected to exposure through a photomask by using an ultra-high pressure mercury lamp (8 mW/cm²) for 10 seconds. After exposure, development was carried out by using a mixture of cyclohexanone and xylene, followed by drying at 200° C. for 2 hours to give a polyamide pattern. The pattern had 10 μm resolution.

REFERENCE EXAMPLE 14

The same procedures as described in Reference Example 13 were carried out except that PA-9 was used instead of PA-5 to form polyamide patterns. The pattern had 20 μm resolution.

REFERENCE EXAMPLE 15

PI-3 and PI-4 were dissolved in N-methylpyrrolidone, respectively, and each solution was applied on a glass plate, dried and heated under N₂ gas atmosphere at 130° C. for one hour, 200° C. for one hour, 300° C. for one hour and 400° C. for one hour to form polyimide films each having a thickness of 30 m. The breaking elongation was measured by using the film with 10 mm in width. The polyimide films made from PI-3 and PI-4 showed a breaking elongation of 7.0% and 0–4.0%, respectively.

What is claimed is:

1. A process for preparing a polyamide which comprises polycondensing a dicarboxylic acid having the following general formula:

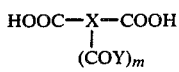

wherein
X is a group having a valence of (m+2), and is a $C_{6-20}$ carbocyclic group, a $C_{3-20}$ heterocyclic group, a $C_{2-20}$ alkyl group or a $C_{2-20}$ alkenyl group, the group having at least one carbon-carbon double bond in the position of conjugating to the carboxylic acid radical or the group having an α, β-unsaturated ketone structure;
Y is —OR or —NRR′, wherein each of R and R′ is independently a $C_{5-20}$ carbocyclic group, a $C_{1-20}$ heterocyclic group, a $C_{1-20}$ alkyl group or substituted group thereof having at least one substituent selected from the group consisting of a $C_{1-12}$ alkoxy group, a $C_{2-12}$ saturated acyl group, a $C_{2-12}$ saturated acyloxy group, a $C_{2-12}$ saturated acylamino group, a $C_{2-12}$ dialkylamino group, a $C_{1-12}$ alkylthio group, a $C_{2-12}$ saturated acylthio group and a $C_{3-12}$ group having at least one silicon atom;
m is 0, 1 or 2; and
—COY is attached to any of the positions ortho, peri, β and γ with respect to the —COOH group,
with a diamine by using a carbodiimide as the condensing agent.

2. A process according to claim 1, wherein the polycondensation is a solution polycondensation.

3. A process according to claim 2, wherein the solution polycondensation is carried out in the presence of an aprotic polar solvent.

4. A process according to claim 1, wherein the carbodiimide is one that urea produced from the carbodiimide is insoluble in acidic water.

5. A process according to claim 4, wherein the carbodiimide is N,N′-dicyclohexylcarbodiimide, N,N′-diethylcarbodiimide, N,N′-diisopropylcarbodiimide, ethylcyclohexylcarbodiimide or N,N′-diphenylcarbodiimide.

6. A process according to claim 5, wherein the carbodiimide is N,N′-dicyclohexylcarbodiimide.

7. A process according to claim 5, wherein the carbodiimide is N,N′- diisopropylcarbodiimide.

8. A process according to claim 1, wherein the carbodiimide is one that urea produced from the carbodiimide is soluble in acidic water.

9. A process according to claim 8, wherein the carbodiimide is 1-ethyl-3-(3-dimethylaminoprpyl)carbodiimide, 1-cyclohexyl-3-(3-dimethylaminopropyl)carbodiimide or carbodiimide.

10. A process according to claim 1, wherein m is 0.
11. A process according to claim 1, wherein m is 1.
12. A process according to claim 1, wherein m is 2.
13. A process according to claim 1, wherein X is a $C_{6-20}$ carbocyclic group.
14. A process according to claim 13, wherein the carbocyclic group is an aromatic carbocyclic group.
15. A process according to claim 1, wherein X is a $C_{3-20}$ heterocyclic group.
16. A process according to claim 1, wherein X is a $C_{2-20}$ alkyl group.
17. A process according to claim 1, wherein X is a $C_{2-20}$ alkenyl group.

18. A process according to claim 1, wherein X is a group having at least one carbon-carbon double bond in the position of conjugating to carboxylic acid radical.
19. A process according to claim 1, wherein X is a group having an α,β-unsaturated ketone structure.
20. A process according to claim 1, wherein each of R and R′ a independently a $C_{5-20}$ carbocyclic group.
21. A process according to claim 1, wherein each of R and R′ is independently a $C_{1-20}$ heterocyclic group.
22. A process according to claim 1, wherein each of R and R′ is independently a $C_{1-20}$ alkyl group.
23. A process according to claim 1, wherein each of R and R′ is independently a substituted $C_{5-20}$ carbocyclic group, a substituted $C_{1-20}$ heterocyclic group or a substituted $C_{1-20}$ alkyl group, which has at least one substituent selected from the group consisting of a $C_{1-12}$ alkoxy group, a $C_{2-12}$ saturated acyl group, a $C_{2-12}$ saturated acyloxy group, a $C_{2-12}$ saturated acylamino group, a $C_{2-12}$ dialkylamino group, a $C_{1-12}$ alkylthio group, a $C_{2-12}$ saturated acylthio group and a $C_{3-12}$ group having at least one silicon atom.
24. A process according to claim 1, wherein the diamine is an aromatic diamine.
25. A process according to claim 1, wherein the diamine has at least one silicon atom.
26. A polyamide having terminal acylurea groups and produced by the method of claim 1.
27. A process according to claim 1 which is conducted at a reaction temperature of from −20° C. to 80° C. and wherein the molar ratio of the condensing agent to the diamine is at least 2 when the dicarboxylic acid is in excess with respect to the diamine, the molar ratio of the condensing agent to the dicarboxylic acid being at least 2 when the diamine is in excess with respect to the dicarboxylic acid, and the molar ratio of the dicarboxylic acid to the diamine being from 0.7 to 1.3.
28. A polyamide having terminal acylurea groups and produced by the method of claim 2.
29. A polyamide having terminal groups, from 10 to 80% of which, based upon the total amount of polymer terminals, have acylurea structure,
the polyamide being a polycondensate of a dicarboxylic acid of the formula:

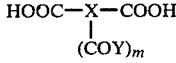

wherein
X is a group having a valence of (m+2), and is a $C_{6-20}$ carbocyclic group, a $C_{3-20}$ heterocyclic group, a $C_{2-20}$ alkyl group or a $C_{2-20}$ alkenyl group, the group having at least one carbon-carbon double bond in the position of conjugating to the carboxylic acid radical or the group having a α,β-unsaturated ketone structure;
Y is —OR or —NRR′, wherein each of R and R′ is independently a $C_{5-20}$ carbocyclic group, a $C_{1-20}$ heterocyclic group, a $C_{1-20}$ alkyl group or a substituted group thereof having at least one subsituent selected from the group consisting of a $C_{1-12}$ alkoxy group, a $C_{2-12}$ saturated acyl group, a $C_{2-12}$ saturated acyloxy group, a $C_{2-12}$ saturated acylamino group, a $C_{2-12}$ dialkylamino group, a $C_{1-12}$ alkylthio group, a $C_{2-12}$ saturated acylthio group and a $C_{3-12}$ group having at least one silicon atom;
m is 0, 1 or 2; and
—COY is attached to any of the positions ortho, peri, β and γ with respect to the —COOH group,
with a diamine.

* * * * *